No. 837,329. PATENTED DEC. 4, 1906.
E. T. MORRIS.
GATE OPENER.
APPLICATION FILED JUNE 5, 1906.
2 SHEETS—SHEET 2.
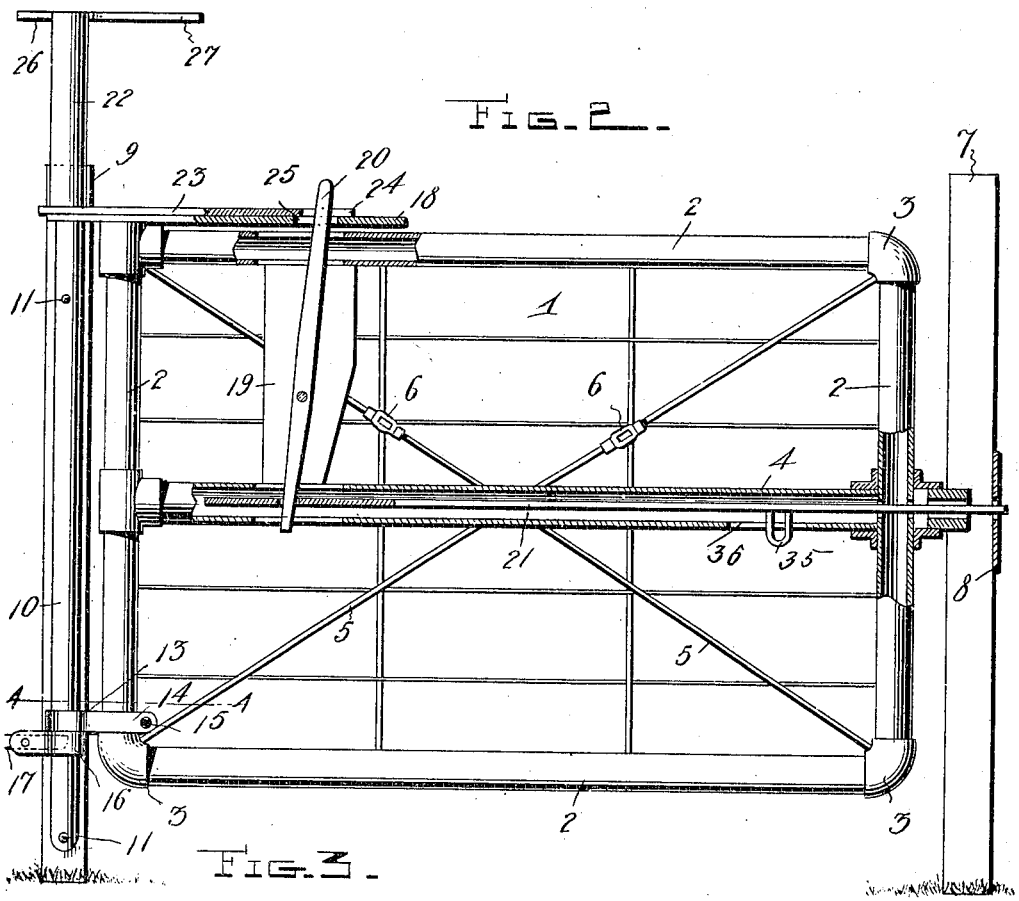
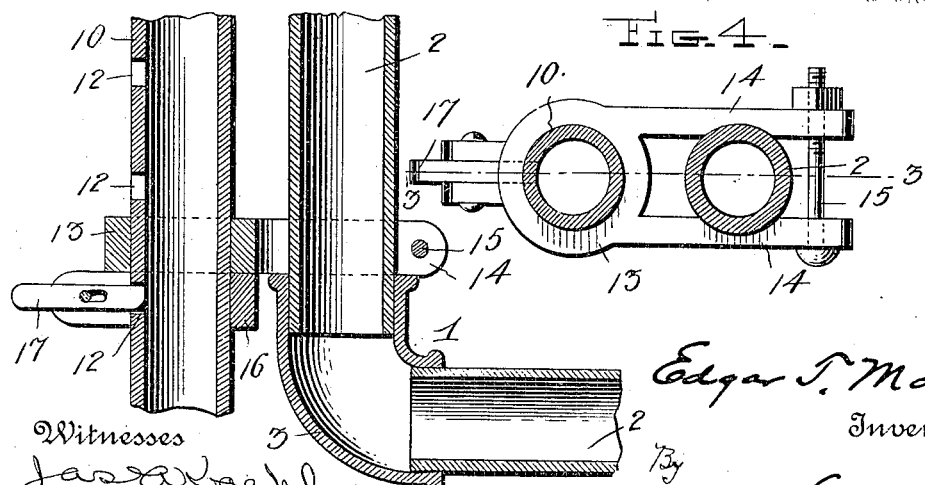
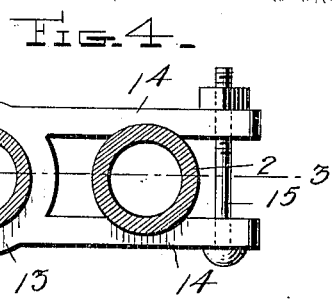
Witnesses
Edgar T. Morris
Inventor

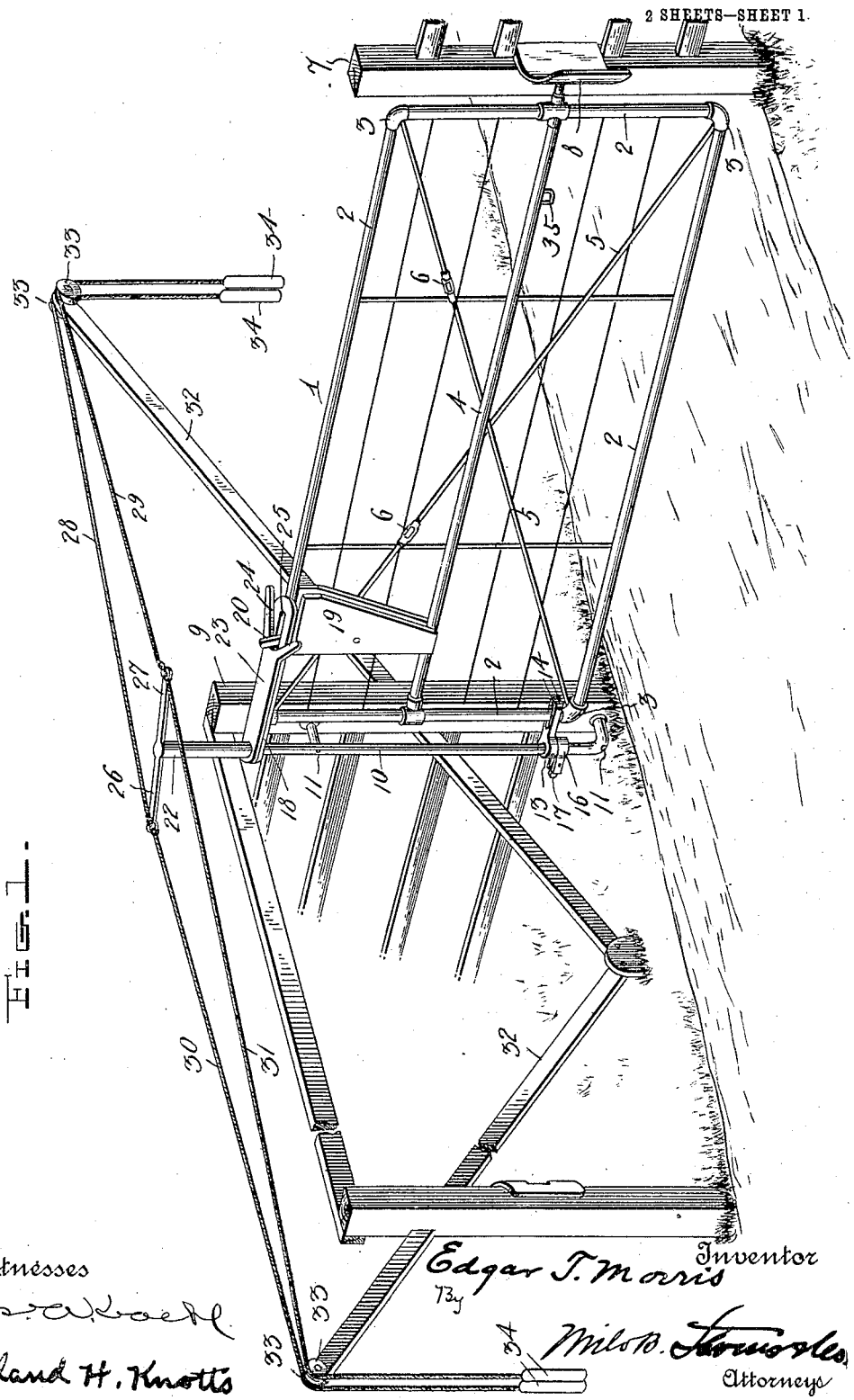

UNITED STATES PATENT OFFICE.

EDGAR T. MORRIS, OF ELBURN, ILLINOIS.

GATE-OPENER.

No. 837,329.　　　　Specification of Letters Patent.　　　　Patented Dec. 4, 1906.

Application filed June 5, 1906. Serial No. 320,269.

*To all whom it may concern:*

Be it known that I, EDGAR T. MORRIS, a citizen of the United States, residing at Elburn, in the county of Kane and State of Illinois, have invented new and useful Improvements in Gate-Openers, of which the following is a specification.

My invention relates to means for operating gates; and the object is to provide a construction which will be simple, compact, and durable, and which may be easily and conveniently operated by an approaching or retiring traveler without the necessity of alighting from the vehicle.

Another object is to provide a construction whereby the operation of raising the latch and swinging the gate open or closed is made continuous and by a single movement of the operator.

With these objects in view I will now describe my improved construction, reference being made to the accompanying drawings, in which—

Figure 1 is a perspective view of the gate. Fig. 2 is an elevation, partly in section. Fig. 3 is a vertical section on the line 3 3 of Fig. 4. Fig. 4 is a horizontal section on the line 4 4 of Fig. 2.

1 represents the gate made up, preferably, of the metal tubing 2, connected by the elbow-joints 3.

4 is a central longitudinal member also of metal tubing, and 5 represents tension-rods extending diagonally from opposite corners of the gate-frame and adjustable by means of the turnbuckles 6.

7 is the latch-post carrying the keeper 8, and 9 is the main gate-post.

10 is the metal-supporting bar, attached to the post 9 by means of bolts 11 and having a plurality of slots 12 therein.

13 is a collar slidably mounted on the bar 10 and provided with the extensions 14, adapted to embrace the upright 2 of the gate-frame and be rigidly secured thereto by means of the bolt 15.

16 is a second collar slidably mounted on the bar 10 below the collar 13 and provided with the pivotally-mounted pin 17, adapted to enter any one of the slots 12 in the bar 10, for a purpose hereinafter described.

The gate is connected to the bar 10 at its upper end by means of the plate 18, slidably mounted on the bar 10 and secured to the gate-frame by any suitable means.

19 is a latch-box, and 20 is a lever pivotally mounted therein and connected at its lower end to the latch 21, working in the bar 4 of the gate-frame.

22 is a sleeve mounted on the upper end of the supporting-bar 10, and 23 is a plate integral with said sleeve. The plate 23 normally rests upon the connecting-plate 18 and is provided at its free end with a V-shaped recess 24, registering above the slot 25 in the plate 18, through which the upper end of the lever 20 projects.

26 and 27 are arms extending from the sleeve 22 and connected to the cords 28, 29, 30, and 31.

32 represents supporting-arms, provided with rollers 33, carrying the cords 28, 29, 30, and 31, and 34 represents handles upon the ends of the said cords for the use of the operator.

The operation of my device is as follows: The traveler upon nearing the gate (from one direction) will lean from the vehicle and pull the handle 34 of the cord 28 to open the same. The sleeve 22 being thus actuated by the arm 26 will turn the plate 23. The slanting inner face of the slot 24 will bear against the lever 20 and push it forward to pull the latch 21 from the keeper 8, and by a continued pull the gate will swing open. After he is through the gate he will pull the cord 30 to close it, the operation being the same as previously described except that the gate is actuated in a reverse direction. Should the traveler approach from the opposite direction from that described, he will pull the cord 31 to open the gate and after passing through pull the cord 29 to close the same.

It will be seen that I also provide means for raising and lowering the gate-frame, and should this be necessary all that is needful is to hold the frame at the desired height and to slide the collar 16 until the pin 17 enters the corresponding one of the slots 12, and the gate will remain at that height, although the operation of opening and closing will be same as before.

I also provide that the latch may be operated manually, in case the operator is in such a position that the automatic means are inconvenient, by means of the handle 35, attached to the latch 21 and working in the slot 36 of the longitudinal member 4.

Having thus described my invention, what I claim is—

1. In a device of the character described, a sliding latch, a pivotally-mounted lever connected at its lower end to said latch, a movable plate having a V-shaped recess in one end in which the free end of said lever rests and means for moving said plate to bear against said lever and draw said latch, substantially as described.

2. In a device of the character described, a gate-frame composed of metal tubing, a pintle-rod, a sliding latch, a pivoted lever connected at one end to said latch, a movable plate having a V-shaped slot in one end engaging the free end of said lever, and means for moving said plate to draw said latch and open said gate, substantially as described.

3. In a device of the character described, the combination with a gate-frame composed of metal tubing, a pintle-rod, means for raising and lowering said frame on said rod, a sliding latch, a pivoted lever connected at one end to said latch, a movable plate having a V-shaped slot in one end engaging the free end of said lever and means for operating said plate to draw said latch and open said gate, substantially as described.

In testimony whereof I have signed my name to this specification in the presence of two subscribing witnesses.

EDGAR T. MORRIS.

Witnesses;
 SIGNA FELTSKOG,
 H. G. BATCHELOR.